United States Patent Office 3,476,039
Patented Nov. 4, 1969

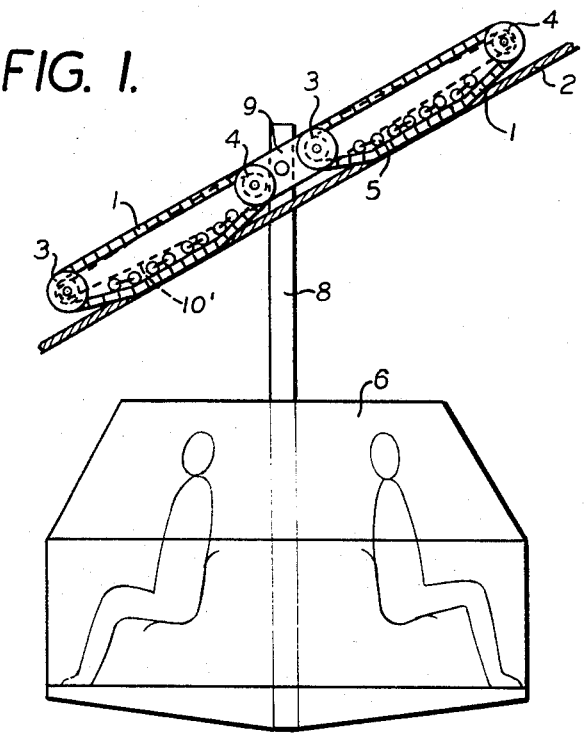
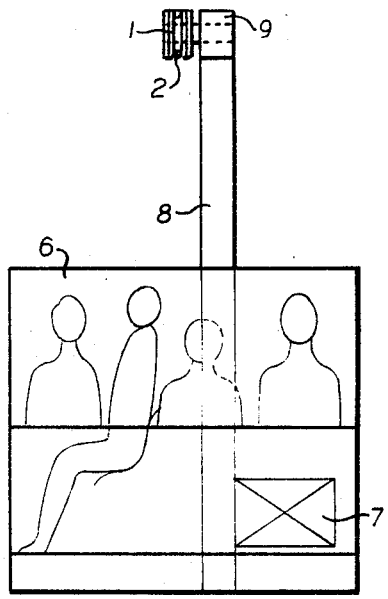
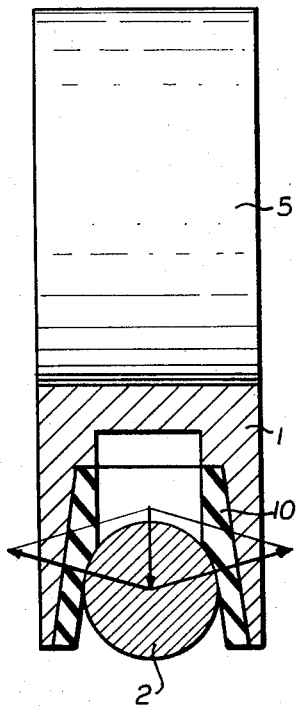
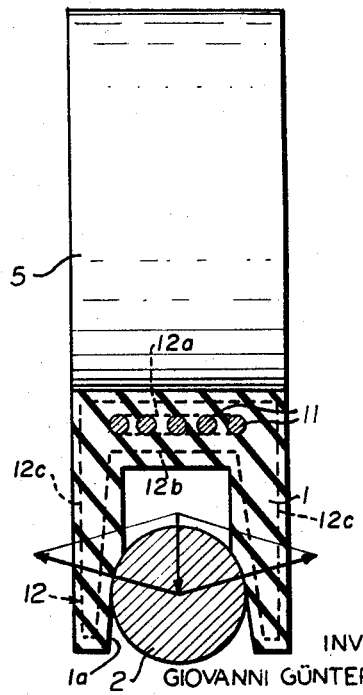

3,476,039
ADHESION DRIVE FOR AUTOMOTIVE
CABLE CARS
Giovanni Gunter Czaloun, 22 Via G. Galilei,
Merano, Bolzano, Italy
Filed Nov. 15, 1967, Ser. No. 683,245
Claims priority, application Italy, Nov. 15, 1966,
25,207/66
Int. Cl. B61b 7/06; B61c 11/02
U.S. Cl. 104—226                                       4 Claims

ABSTRACT OF THE DISCLOSURE

An adhesion drive for a self-propelled cable car, which comprises a supporting cable and at least one endless belt adapted as a driving element, and including a plurality of carrying rollers. A cable car is suspended from the endless belt. The caterpillar is pressed vertically downwardly by the weight of the cable car onto the supporting cable, in order to roll thereon. The endless belt has an undercut guiding groove which is tapered down upwardly and receives the cable, to obtain a wedge effect between the cable and the belt, in order to receive the necessary safety against sliding.

---

The present invention relates to an adhesion drive for automotive cable cars.

Vehicles or cars which are capable of moving by their own power, that is by means of a built-in-drive without a pulling cable, on an even sharply inclined supporting cable have appreciable technical and economical advantages over conventional cable car systems. Proposals for structure of such vehicles and such cable car ararangements have been made before. The main problem of this system, namely to transmit the driving force to the supporting cable such, that a safe, fast and noiseless operation is possible, has not been satisfactorily solved, however.

It is one object of the present invention to provide the adhesion drive for automotive cable cars, which constitutes a new approach or solution of the above stated drive.

It is another object of the present invention to provide an adhesion drive for automotive cable cars, wherein the elements which bring about the friction connection between the carrying cable and the vehicle are one or a plurality of particular endless belt drives, which are urged by the weight of the vehicle perpendicularly from above downwardly onto the supporting cable and roll on the latter. The endless belt drive comprises each a driving disc normally disposed on the valley side and a transformer disc normally disposed on the mountain side, which transformer disc simultaneously serves as a tension disc. The axles of both discs are horizontal and perpendicular to the supporting cable. The motor force is produced in known manner by an internal combustion engine carried by the vehicle and can be transmitted for instance by a hydrostatic system (not shown) to the driving discs. The endless belts have on their outer side a passing guiding groove which grips the supporting cable in a manner safely against derailing. The vehicle weight is transmitted from a series of balanced carrying rollers to the endless driving belt and from the latter is equally divided on the supporting cable.

The guiding groove of this endless belt arrangement has normally an undercut, so that a strong pressure force is created in the engaging faces between the supporting cable and the endless belt by a wedging effect. This wedging effect can be theoretically selectively increased by a widening of the undercut, whereby the limits are given only by the strength characteristics of the endless belt. By the relatively large engaging face of the endless belt on the supporting cable, pressure forces can be selected thereby without surpassing the permissible face pressures, which pressure forces warrant, at all practically encountered upgrades, a sufficient safety against slipping. The undercut has parallel side faces, so that, upon continuous wear of the running face, the conditions of the forces remain unchanged. The endless belts can be suitably designed in form of two different types:

(1) The first design is an embodiment providing a link chain, the links of which consist of hard material and are connected together by means of bolts. The guide groove is in this case normally lined with elastic material.

(2) The second design is an embodiment providing an endless ring of elastic material, whereby the necessary strength is obtained by an armour or reinforcement poured in and consisting of elements capable of resistance. The armour of this endless belt comprises an endless continuous pulling element band not expandable in longitudinal direction but flexible, preferably of steel cables, for receiving the pulling forces as well as of stiff bows or frames which are poured in cross-wise to the guide roller, such, that they surround this guide groove and thereby receive the lateral forces created by the wedge effect. Herein the term "endless belt" includes both the link chain as well as the endless continuous ring, although not limited thereto.

With these and other objects in view which will become apparent in the following detailed description, the present invention will be clearly understood in connection with the accompanying drawing, in which:

FIGURE 1 is a schematic side elevation of a cable car with the adhesion drive;

FIG. 2 is an end view of the cable car;

FIG. 3 is a cross-section of the endless driving belt disclosing the embodiment of a link chain; and FIG. 4 is a cross-section of the endless driving belt disclosing the embodiment as one part ring of elastic material.

Referring now to the drawing, the adhesion drive for automotive cable cars comprises two endless driving belts 1 properly carried by a supporting cable 2. The endless driving belts 1 are equipped with driving discs 3, as well as turning discs 4. Furthermore, the endless driving belts 1 are equipped with carrying rollers 5 and operatively suspended from the belts is a cable car 6, in which an internal combustion engine 7 is mounted, which engine 7 drives the driving discs 3 by any conventional means (not shown). The cable car 6 is suspended from the belts 1 by means of a hanger 8, which is equipped with the main carrier 9.

Referring now again to the drawing, and in particular to FIG. 3, it will be apparent that the endless driving belt comprises a link chain consisting of a plurality of links which are lined inside with elastic material 10.

FIG. 4 is shown as a cross-section through the band in connection with the second embodiment to constitute a one part ring continuous of elastic material which includes a longitudinal reinforcement member or pulling elements 11, as well as cross-reinforcement bows or frames 12 incorporated into the ring material.

In both embodiments it is apparent that due to the wedge effect a sufficient adhesion is brought about between the endless driving belts 1 and 1', respectively, and the supporting cable 2.

The cross-reinforcement bows or frames 12 are substantially of U-shape and include an apex portion 12b between the legs 12c thereof. The frames 12 are disposed cross-wise to the ring 1' and surround guiding groove 1a. An elongated lateral opening 12a, although not limited thereto, is formed in the apex portion 12b of the frames 12 through which the pulling elements 11 extend.

As illustrated in FIG. 1, the discs 3 and 4 are carried by a carriage 10' which is illustrated for simplicity as a one-part swing lever, the carriage integrally joining the main carrier 9 and the discs. The carriage 10' is connected pivotally to the hanger 8, which hanger supports the cable car 6, the hanger remaining vertically oriented due to the weight of the cable car.

FIG. 1 illustrates the cooperation of the rollers 5 with the two belts 1. The two belt drives are arranged on the carriage 10', the former preferably comprising the driving discs 3 and the transformer-tension discs 4, preferably disposed on the valley side and on the mountain side, respectively. The carrying rollers 5 are pivoted in pairs by means of the swing lever on the carriage 10' between the discs 3 and 4. Each endless belt 1 encloses the wheels 3 and 4 as well as the rollers 5. The weight of the cable car 6 is transmitted to the supporting cable 2 through the hanger 8, the carriage 10', the pairs of rollers 5 and the endless belts 1, the latter in the form of a link chain (FIG. 3) or a one part ring (FIG. 4) of the two endless driving belts 1.

While I have disclosed two embodiments of the present invention, it is to be understood that these embodiments are given by example only and not in a limiting sense.

I claim:
1. An adhesion drive for a self-propelled cable car, driven over a supporting cable, comprising
   at least one endless driving belt adapted as a driving element, and including a plurality of carrying rollers,
   a cable car operatively suspended from said endless driving belt,
   said endless driving belt being pressed vertically downwardly by the weight of said cable car onto said supporting cable, in order to roll thereon,
   said endless driving belt comprises a one-piece continuous ring ol elastic material including side walls forming therebetween a U-shaped guiding groove being tapered down upwardly and receiving said cable, to obtain a wedge effect between said cable and said ring, in order to receive the necessary safety against sliding,
   a longitudinal reinforcement element for receiving pulling forces and comprising at least one bendable pulling element of nonexpandable rigid material, and
   a plurality of substantially U-shaped cross-reinforcement bow members disposed substantially in parallel in said ring surrounding said guiding groove, whereby the pulling forces are taken up by said bendable pulling element and the lateral forces caused by the wedge effect between said supporting cable and said ring are assumed by said bow members.

2. The adhesion drive, as set forth in claim 1, wherein said substantially U-shaped cross-reinforcement bow members each include an apex portion between the legs of the U-shaped member,
   said apex portion is formed with at least one opening therein, and
   said at least one bendable pulling element is guided through said at least one opening of said apex portion of said bow members.

3. The adhesion drive, as set forth in claim 2, wherein said at least one opening is an elongated opening extending laterally.

4. The adhesion drive, as set forth in claim 3, wherein said at least one pulling element comprises a plurality of pulling elements passing through said elongated opening.

References Cited

UNITED STATES PATENTS 404,500    6/1989    Pendleton _____ 104—226

FOREIGN PATENTS 602,415    12/1925    France.

ARTHUR L. LA POINT, Primary Examiner

D. F. WORTH, Assistant Examiner